(12) United States Patent
Yamamoto et al.

(10) Patent No.: US 11,784,355 B2
(45) Date of Patent: Oct. 10, 2023

(54) NEGATIVE ELECTRODE INCLUDING MICROCAPSULE AND LITHIUM ION SECONDARY BATTERY INCLUDING THE NEGATIVE ELECTRODE

(71) Applicant: MITSUI CHEMICALS, INC., Tokyo (JP)

(72) Inventors: Shinji Yamamoto, Sodegaura (JP); Yuri Endo, Matsudo (JP)

(73) Assignee: MITSUI CHEMICALS, INC., Tokyo (JP)

( * ) Notice: Subject to any disclaimer, the term of this patent is extended or adjusted under 35 U.S.C. 154(b) by 683 days.

(21) Appl. No.: 16/975,844

(22) PCT Filed: Mar. 29, 2019

(86) PCT No.: PCT/JP2019/014282
§ 371 (c)(1),
(2) Date: Aug. 26, 2020

(87) PCT Pub. No.: WO2019/189865
PCT Pub. Date: Oct. 3, 2019

(65) Prior Publication Data
US 2020/0403276 A1 Dec. 24, 2020

(30) Foreign Application Priority Data
Mar. 30, 2018 (JP) ................ 2018-068815

(51) Int. Cl.
*H01M 10/42* (2006.01)
*H01M 4/13* (2010.01)
(Continued)

(52) U.S. Cl.
CPC ......... *H01M 10/4235* (2013.01); *H01M 4/13* (2013.01); *H01M 4/621* (2013.01);
(Continued)

(58) Field of Classification Search
CPC .... H01M 10/4235; H01M 4/13; H01M 4/621; H01M 4/625; H01M 10/0525;
(Continued)

(56) References Cited

U.S. PATENT DOCUMENTS

| 10,547,051 B2 * | 1/2020 | Cho ...................... H01M 4/505 |
| 2012/0315541 A1 * | 12/2012 | Sasaki ................... H01M 4/622 |
| | | 429/211 |

(Continued)

FOREIGN PATENT DOCUMENTS

| CN | 107735891 A | 2/2018 | |
| CN | 105280881 B | * 10/2018 | ........ H01M 10/0525 |

(Continued)

OTHER PUBLICATIONS

International Search Report (PCT/ISA/210) dated Jul. 2, 2019, by the Japanese Patent Office as the International Searching Authority for International Application No. PCT/JP2019/014282.

(Continued)

*Primary Examiner* — Kaity V Chandler
(74) *Attorney, Agent, or Firm* — BUCHANAN INGERSOLL & ROONEY PC

(57) ABSTRACT

A negative electrode for a lithium ion secondary battery, the negative electrode including a negative electrode current collector and a negative electrode mixture layer that is applied to at least one side of the negative electrode current collector, the negative electrode mixture layer containing a negative electrode active material, a conductive auxiliary, a binder, a polymer particle having a softening point of from 70° C. to 150° C., and a thermally expandable microcapsule having a maximum volume expansion temperature that is higher than the softening point of the polymer particle.

10 Claims, 5 Drawing Sheets

(51) Int. Cl.
  *H01M 10/0525* (2010.01)
  *H01M 4/62* (2006.01)
  *H01M 50/417* (2021.01)
  *H01M 50/489* (2021.01)
  *H01M 4/02* (2006.01)

(52) U.S. Cl.
  CPC ....... *H01M 4/625* (2013.01); *H01M 10/0525* (2013.01); *H01M 50/417* (2021.01); *H01M 50/489* (2021.01); *H01M 2004/027* (2013.01)

(58) Field of Classification Search
  CPC ............. H01M 50/417; H01M 50/489; H01M 2004/027; H01M 4/622; H01M 50/414; H01M 4/62; Y02E 60/10
  See application file for complete search history.

(56) References Cited

U.S. PATENT DOCUMENTS

| | | | | |
|---|---|---|---|---|
| 2014/0023922 A1* | 1/2014 | Isshiki | ................... | H01M 4/134 429/211 |
| 2014/0205532 A1* | 7/2014 | Takeuchi | .............. | H01M 4/587 423/448 |
| 2014/0234708 A1* | 8/2014 | Park | .................... | H01M 4/0404 252/511 |
| 2014/0255292 A1* | 9/2014 | Wakizaka | ............. | H01M 4/587 423/448 |
| 2015/0162600 A1* | 6/2015 | Wakizaka | ............. | H01M 4/364 423/445 R |
| 2016/0240836 A1 | 8/2016 | Aotani et al. | | |
| 2017/0288211 A1* | 10/2017 | Zhamu | .................. | H01M 4/386 |
| 2017/0365857 A1* | 12/2017 | Isozaki | ................. | H01M 4/622 |
| 2018/0069260 A1* | 3/2018 | Wakizaka | ......... | H01M 10/0525 |
| 2019/0260028 A1* | 8/2019 | Zhamu | .................. | H01M 4/62 |
| 2020/0119337 A1* | 4/2020 | Jang | ....................... | H01M 4/622 |
| 2020/0212426 A1* | 7/2020 | Jang | ..................... | H01M 4/133 |
| 2020/0313162 A1* | 10/2020 | Zhamu | .................. | H01M 4/625 |

FOREIGN PATENT DOCUMENTS

| | | | | |
|---|---|---|---|---|
| JP | 2003-031208 A | | 1/2003 | |
| JP | 2006-172777 A | | 6/2006 | |
| JP | 4727021 B2 | | 4/2011 | |
| JP | 2013-105681 A | | 5/2013 | |
| JP | 2014056813 A | * | 3/2014 | ......... H01M 10/0525 |
| JP | 2015115168 A | | 6/2015 | |
| KR | 10-2016-0061391 A | | 5/2016 | |
| KR | 10-2016-0061391 A1 | | 5/2016 | |
| WO | WO-0241417 A1 | * | 5/2002 | .............. B82Y 20/00 |
| WO | WO-2013080938 A1 | * | 6/2013 | .............. C08F 220/02 |

OTHER PUBLICATIONS

Written Opinion (PCT/ISA/237) dated Jul. 2, 2019, by the Japanese Patent Office as the International Searching Authority for International Application No. PCT/JP2019/014282.

* cited by examiner

NEGATIVE ELECTRODE INCLUDING MICROCAPSULE AND LITHIUM ION SECONDARY BATTERY INCLUDING THE NEGATIVE ELECTRODE

TECHNICAL FIELD

The present invention relates to a negative electrode including a microcapsule, and more specifically, to a negative electrode including a negative electrode mixture layer containing a negative electrode active material, a conductive auxiliary, a binder, a polymer particle having a softening point of from 70° C. to 150° C., and a thermally expandable microcapsule having a maximum volume expansion temperature that is higher than the softening point of the polymer particle, and to a lithium ion secondary battery including the negative electrode.

BACKGROUND ART

In recent years, lithium ion secondary batteries have been widely used as power sources of electronic devices such as mobile phones and laptop computers, of electric vehicles, and for power storage. In particular, demand for batteries having high capacity, high output, and high energy density that can be mounted on hybrid vehicles and electric vehicles has been rapidly expanding in recent years. Lithium ion secondary batteries have the advantage of high energy density. However, sufficient measures for safety are required because lithium metal and lithium ions are used in the batteries.

It has been conventionally reported that against a rapid temperature rise inside a battery due to overdischarge, overcharge, and the like, a thermally expandable microcapsule is disposed in the battery in order to inhibit a conductive state in the battery (see Patent Document 1).

Furthermore, an electrode for a lithium ion secondary battery and a lithium ion secondary battery including the electrode have been reported. The electrode includes a polymer particle having a melting point (Tm) of from 70° C. to 150° C. in the positive electrode or negative electrode active material layer, so that the electrode has a function of increasing the internal resistance of the battery in the case of a temperature rise and has an excellent battery characteristic during usual operation, and is manufactured by a simple manufacturing process. (For example, see Patent Document 2).

Patent Document 1: Japanese Patent No. 4727021
Patent Document 2: Japanese Patent Application Laid-Open (JP-A) No. 2015-115168

SUMMARY OF INVENTION

Technical Problem

An object of the present invention is to suppress a short-circuit current by providing a PTC function in an electrode and increasing the resistance of the electrode in the case of heat generation in order to cut off a short-circuit current caused by an internal short-circuit or the like and suppress abnormal heat generation of a lithium ion secondary battery.

Solution to Problem

A solution to the above-described problem includes the following aspects.

<1> A negative electrode for a lithium ion secondary battery, the negative electrode including:
a negative electrode current collector; and
a negative electrode mixture layer that is applied to at least one side of the negative electrode current collector, the negative electrode mixture layer comprising:
a negative electrode active material,
a conductive auxiliary,
a binder,
a polymer particle having a softening point of from 70° C. to 150° C., and
a thermally expandable microcapsule having a maximum volume expansion temperature that is higher than the softening point of the polymer particle.

<2> The negative electrode according to the item <1>, wherein the softening point of the polymer particle is lower than a volume expansion start temperature of the thermally expandable microcapsule.

<3> The negative electrode according to the item <1> or <2>, wherein the conductive auxiliary includes a carbon particle having an average particle size of 5 μm or less and a primary particle size of 0.5 μm or less, the binder has an average particle size of from 0.1 to 0.3 μm, and the polymer particle has an average particle size of from 0.1 to 5 μm.

<4> The negative electrode according to any one of items <1> to <3>, wherein the negative electrode mixture layer contains the conductive auxiliary at a content of from 0.1 to 3% by mass, and contains the binder and the polymer particle at a total combined content of from 0.5 to 4% by mass.

<5> The negative electrode according to any one of items <1> to <4>, wherein the thermally expandable microcapsule has an average particle size of 50 μm or less.

<6> The negative electrode according to any one of items <1> to <5>, wherein the negative electrode mixture layer contains the thermally expandable microcapsule at a content of from 0.1 to 4% by mass.

<7> The negative electrode according to any one of items <1> to <6>, wherein the thermally expandable microcapsule includes:
an outer shell including a thermoplastic resin; and
a volatile expanding agent that includes a hydrocarbon having a boiling point of 100° C. or less and is enclosed in the outer shell.

<8> The negative electrode according to any one of items <1> to <7>, wherein the binder is polyacrylic acid, styrene-butadiene rubber, polyvinyl alcohol, polyvinyl acetate, polyethylene oxide, polyvinyl pyrrolidone, or polyacrylamide.

<9> A lithium ion secondary battery, including the negative electrode according to any one of items <1> to <8>, a positive electrode, a separator, and a lithium ion.

<10> The lithium ion secondary battery according to item <9>, wherein the separator includes a thermoplastic resin, and the thermoplastic resin has a softening point that is higher than the softening point of the polymer particle and lower than the volume expansion start temperature of the thermally expandable microcapsule.

<11> A lithium ion secondary battery including a negative electrode having a resistance that increases as a result of heat generation due to an internal short-circuit, the negative electrode including a negative electrode mixture layer that comprises:
a negative electrode active material;
a conductive auxiliary;

a binder;

a polymer particle having a softening point of from 70° C. to 150° C.; and a thermally expandable microcapsule having a volume expansion start temperature that is higher than the softening point of the polymer particle, wherein the negative electrode mixture layer contains each of the polymer particle and the thermally expandable microcapsule at a content necessary for increasing the resistance of the negative electrode continuously or stepwise in a case in which a temperature of the negative electrode mixture layer rises above the softening point of the polymer particle as a result of the heat generation.

Advantageous Effects of Invention

In the negative electrode for a lithium ion secondary battery according to the invention, a short-circuit current can be suppressed by increasing the resistance of the negative electrode in the case of abnormal heat generation due to an internal short-circuit or the like.

DESCRIPTION OF EMBODIMENTS

In the present description, a numerical range represented using "to" means a range including numerical values described before and after "to" as a lower limit and an upper limit.

In the present description, in a case in which there are a plurality of substances corresponding to each component in a composition, the amount of each component in the composition is the total amount of the plurality of substances present in the composition unless otherwise specified.

Hereinafter, preferred embodiments according to the present invention will be described. The invention can be widely applied to various lithium ion secondary batteries including a negative electrode including a negative electrode current collector and a negative electrode mixture layer applied to at least one side of the negative electrode current collector, a positive electrode, a separator, and a lithium ion. In this kind of battery, the negative electrode mixture layer contains a negative electrode active material, a conductive auxiliary, a binder, a polymer particle having a softening point of from 70° C. to 150° C., and a thermally expandable microcapsule having a maximum volume expansion temperature that is higher than the softening point of the polymer particle. By adding the polymer particle and the thermally expandable microcapsule to the negative electrode according to the present embodiment, the resistance of the negative electrode mixture layer is increased in the case of a rapid temperature rise in the battery, so that the effect of suppressing the overheating of the battery is exhibited. Hereinafter, the invention will be described in more detail mainly with reference to the negative electrode and the lithium ion secondary battery including the negative electrode as examples, but the application of the invention is not intended to be limited to such an electrode or a battery.

[Overall Configuration of Lithium Ion Secondary Battery]

Figure 1:
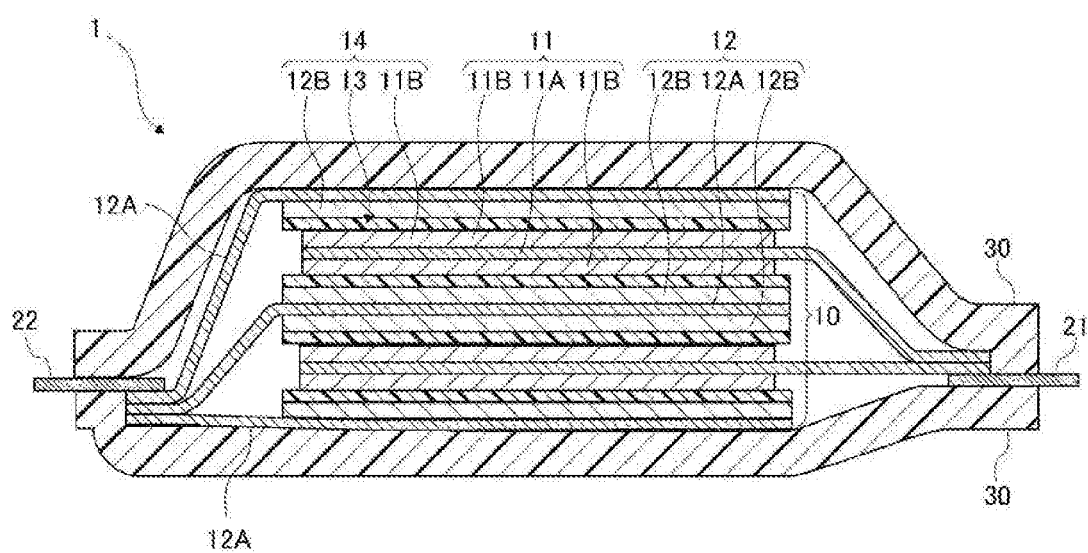
FIG. 1 is a sectional view of a lithium ion secondary battery according to an embodiment of the invention.

First, an overall configuration of a lithium ion secondary battery according to one embodiment of the invention will be described with reference to the drawings. FIG. 1 is a schematic sectional view illustrating a lithium ion secondary battery according to one embodiment of the invention. Such a lithium ion secondary battery is called a stacked lithium ion secondary battery.

Although FIG. 1 shows the configuration of the stacked cell, the lithium ion secondary battery according to the invention may be wound so that the positive electrode, the negative electrode, and the separator are stacked and wound in layers.

As shown in FIG. 1, a lithium ion secondary battery 1 according to the present embodiment has a configuration in which a battery element 10 to which a positive electrode lead 21 and a negative electrode lead 22 are attached is enclosed in an exterior body 30 that is formed with a laminate film. In the present embodiment, the positive electrode lead 21 and the negative electrode lead 22 are led out in the opposite directions from the inside to the outside of the exterior body 30. Although not shown, the positive electrode lead and the negative electrode lead may be led out in the same direction from the inside to the outside of the exterior body. Such a positive electrode lead and a negative electrode lead can be attached to the positive electrode current collector and the negative electrode current collector described below by, for example, ultrasonic welding, resistance welding, or the like.

As shown in FIG. 1, the battery element 10 has a configuration in which a plurality of laminates are stacked in which a positive electrode 11 having a positive electrode mixture layer 11B formed on both main surfaces of a positive electrode current collector 11A, a separator 13, and a negative electrode 12 having a negative electrode mixture layer 12B formed on both main surfaces of a negative electrode current collector 12A are stacked. At this time, the positive electrode mixture layer 11B formed on one main surface of the positive electrode current collector 11A of one positive electrode 11 and the negative electrode mixture layer 12B formed on one main surface of the negative electrode current collector 12A of the negative electrode 12 adjacent to the one positive electrode 11 are opposite to each other with the separator 13 interposed therebetween. Thus, the positive electrode, the separator, and the negative electrode are stacked in this order to form the plurality of laminates.

By putting an electrolytic solution containing an electrolyte ($LiPF_6$) into the battery element, one unit cell layer 14 is configured to have the adjacent positive electrode mixture layer 11B, separator 13, and negative electrode mixture layer 12B. Therefore, the lithium ion secondary battery 1 according to the present embodiment has a configuration in which a plurality of the unit cell layers 14 are stacked to be electrically connected in parallel. The positive electrode and the negative electrode may have an active material layer formed on one side of each current collector.

[Negative Electrode for Lithium Ion Secondary Battery]

Figure 2:
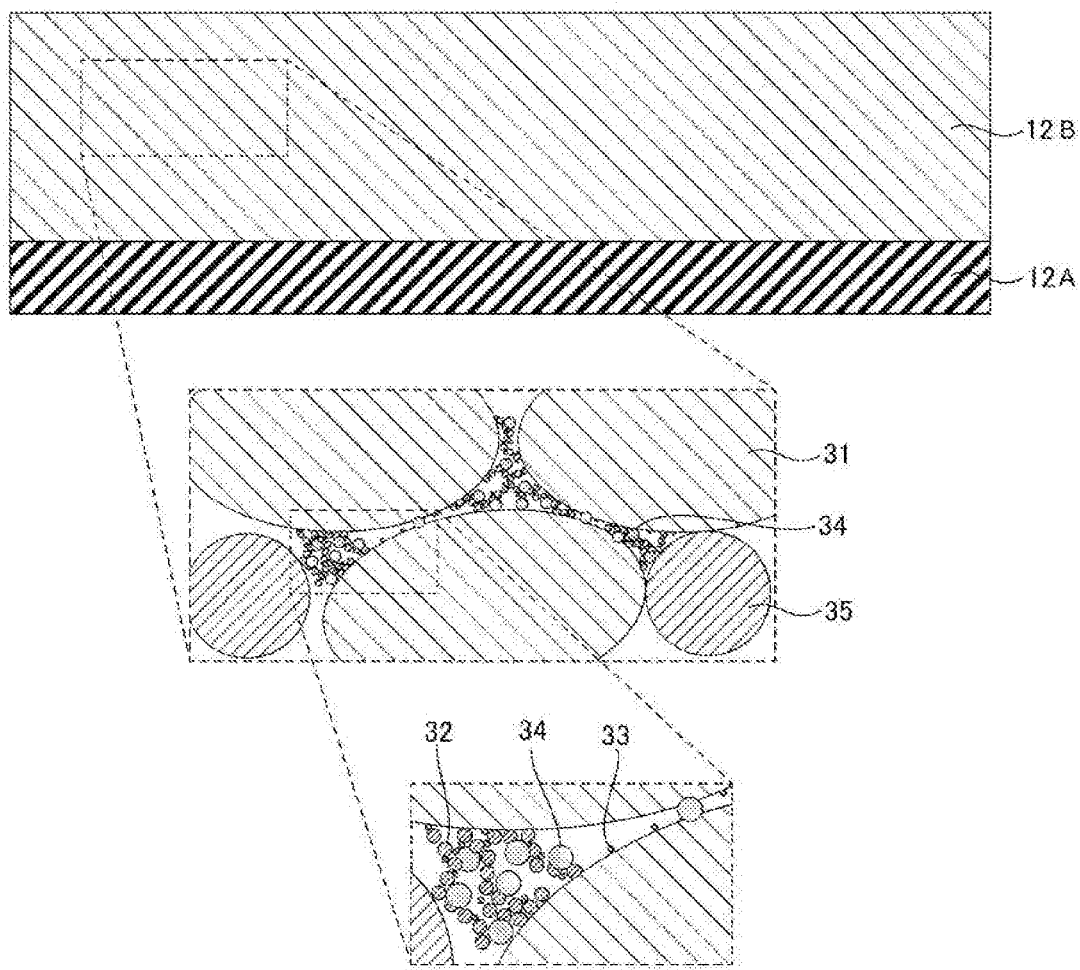
FIG. 2 is a schematic sectional view illustrating a structure of a negative electrode according to an embodiment of the invention.

FIG. 2 is a schematic sectional view illustrating a structure of the negative electrode 12 as an electrode according to one embodiment of the invention. The negative electrode 12 shown in FIG. 2 has a configuration in which the negative electrode mixture layer 12B is provided on one surface of the negative electrode current collector 12A. Here, the negative electrode mixture layer 12B contains a negative electrode active material 31, a conductive auxiliary 32, a binder 33, a polymer particle 34, and a thermally expandable microcapsule 35. These substances in the negative electrode mixture layer 12B are in contact with the electrolytic solution containing the electrolyte ($LiPF_6$) put into the battery.

As shown in FIG. 2, the negative electrode mixture layer 12B in the present embodiment is formed in a film shape having a predetermined thickness on the surface of the negative electrode current collector 12A. Various materials can be used in the negative electrode current collector 12A, and a metal or an alloy is usually used. Specific examples of the conductive substrate for the positive electrode include aluminum, nickel, and SUS, and specific examples of the conductive substrate for the negative electrode include copper, nickel, and SUS. Among the conductive substrates, aluminum and copper are preferable in view of the balance between the high conductivity and the cost. Note that the word "aluminum" means aluminum and aluminum alloys, and the word "copper" means pure copper and copper alloys. In the present embodiment, an aluminum foil can be used in the secondary battery positive electrode side and in the secondary battery negative electrode side, and a copper foil can be used in the secondary battery negative electrode side. The aluminum foil is not particularly limited, but various materials such as pure aluminum-based A1085 and A3003 can be used. In the same manner, the copper foil is not particularly limited, and a rolled copper foil or an electrolytic copper foil is preferably used.

The negative electrode mixture layer according to the present embodiment preferably has a thickness of, for example, 5 μm or more, and more preferably 10 μm or more. Furthermore, the negative electrode mixture layer preferably has a thickness of 200 μm or less, more preferably 100 μm or less, and still more preferably 75 μm or less. In a case in which the negative electrode mixture layer has a thickness in the above-described range, a sufficient function of absorbing and releasing lithium can be easily obtained with respect to charge and discharge at a high charge and discharge rate. Hereinafter, the negative electrode active material 31, the conductive auxiliary 32, the binder 33, the polymer particle 34, and the thermally expandable microcapsule 35 those are included in the negative electrode mixture layer 12B will be described in order.

(Negative Electrode Active Material)

As the negative electrode active material, at least one can be used selected from the group consisting of metallic lithium, lithium-containing alloys, metals and alloys capable of being alloyed with lithium, oxides capable of being doped and undoped with a lithium ion, transition metal nitrides capable of being doped and undoped with a lithium ion, and carbon materials capable of being doped and undoped with a lithium ion (one may be used singly, or a mixture containing two or more kinds thereof may be used). Among the negative electrode active materials, the carbon materials capable of being doped and undoped with a lithium ion are preferable. Examples of the carbon material include carbon blacks, activated carbon, graphite materials (artificial graphite and natural graphite), and amorphous carbon materials. The carbon material may have any form of a fibrous, a spherical, a potato-like, or a flake-like form. The particle size of the carbon material is not particularly limited, and is usually from 5 to 50 μm, and preferably about from 20 to 30 μm.

Specific examples of the amorphous carbon material include hard carbon, coke, mesocarbon microbeads (MCMBs) fired at 1,500° C. or less, and mesophase pitch carbon fibers (MCFs).

Examples of the graphite material include natural graphite and artificial graphite. As the artificial graphite, a graphitized MCMB, a graphitized MCF, or the like is used. In addition, as the graphite material, a material containing boron, or the like can be used. As the graphite material, a material coated with a metal such as gold, platinum, silver, copper, or tin, a material coated with amorphous carbon, or a mixture of amorphous carbon and graphite can also be used.

The carbon materials may be used singly, or in mixture of two or more kinds thereof.

(Conductive Auxiliary)

The negative electrode mixture layer preferably contains the conductive auxiliary. As the conductive auxiliary used in the invention, a known conductive auxiliary can be used. The known conductive auxiliary is not particularly limited as long as it is a conductive carbon material. Graphite, carbon blacks, conductive carbon fibers (carbon nanotubes, carbon nanofibers, and carbon fibers), fullerenes, and the like can be used singly, or in combination of two or more kinds thereof. Examples of a commercially available carbon black include TOKABLACK (registered trademark) #4300, #4400, #4500, #5500, and the like (manufactured by TOKAI CARBON CO., LTD., furnace black), PRINTEX (registered trademark) L and the like (manufactured by DegussaAG, furnace black), RAVEN 7000, 5750, 5250, 5000ULTRAIII, 5000ULTRA, and the like, CONDUCTEX SC ULTRA, CONDUCTEX 975ULTRA, and the like, PUER BLACK 100, 115, 205, and the like (manufactured by Columbian Chemicals Company, furnace black), #2350, #2400B, #2600B, #30050B, #3030B, #3230B, #3350B, #3400B, #5400B, and the like (manufactured by Mitsubishi Chemical Corporation, furnace black), MONARCH 1400, 1300, 900, VULCAN (registered trademark) XC-72R, BLACK PEARLS 2000, LITX-50, LITX-200, and the like (manufactured by Cabot Corporation, furnace black), ENSACO (registered trademark) 250G, ENSACO (registered trademark) 260G, ENSACO (registered trademark) 350G, SUPER P-Li (manufactured by TIMCAL Ltd.), KETJEN-BLACK (registered trademark) EC-300J, EC-600JD (manufactured by AKZO NOBEL CHEMICALS B. V.), DENKA BLACK (registered trademark), DENKA BLACK (registered trademark) HS-100, FX-35 (manufactured by DENKI KAGAKU KOGYO KABUSHIKI KAISHA, acetylene black), and the like, and examples of the graphite include artificial graphite and natural graphite such as flaky graphite, massive graphite, and earthy graphite, but examples are not limited thereto. The conductive auxiliary contained in the negative electrode mixture layer preferably has an average particle size of 5 μm or less, and more preferably from 1 to 4 μm for the purpose that the conductive auxiliary is dispersed among particles each contained in the negative electrode mixture layer and functions as a conductive auxiliary. Furthermore, the primary particle size of the conductive auxiliary is preferably 0.5 μm or less, and more preferably from 0.1 to 0.4 μm. The negative electrode mixture layer preferably contains the conductive auxiliary at a content of 0.1% by mass or more, and preferably, for example, about from 0.1 to 3% by mass for the purpose that the handling property of the slurry is improved and the capacity density of the negative electrode is enhanced.

(Binder)

As the binder, one can be used, or two or more can be used in combination selected from styrene-butadiene rubber (SBR), acrylonitrile-butadiene rubber, acrylonitrile-butadiene-styrene rubber, carboxymethylcellulose (CMC), hydroxypropylmethylcellulose, polyvinyl alcohol, hydroxypropylcellulose, or diacetylcellulose. In particular, it is desirable to use a mixture, as the binder, in which a water-dispersible binder such as an emulsion of styrene-butadiene rubber and a water-soluble binder such as carboxymethylcellulose are mixed if appropriate.

The binder is desirably used in an amount of from 0.1 to 4% by mass with respect to the negative electrode mixture layer in order to achieve both the physical properties (the electrolytic solution permeability and the peel strength) of the negative electrode mixture layer and the battery performance. In a case in which the amount is less than 0.1% by mass, the adhesive strength of the active material is reduced. As a result, it is possible that the active material is detached during a charge and discharge process. In a case in which the amount is more than 4% by mass, the amount of the active material is reduced and undesirable in terms of the battery capacity.

(Polymer Particle)

The polymer particle having a softening point of from 70° C. to 150° C. in the present invention is not particularly limited as long as it is, for example, a particle of a thermoplastic resin having a softening point of from 70° C. to 150° C. Examples of the polymer particle include particles of polyethylene, polypropylene, ethylene-vinyl acetate copolymers (EVAs), polyvinyl chloride, polyvinylidene chloride, polyvinyl fluoride, polyvinylidene fluoride, polyamides, polystyrene, polyacrylonitrile, thermoplastic elastomers, polyethylene oxide, polyacetal, thermoplastic modified cellulose, polysulfone, and polymethyl (meth)acrylate. Among the particles, particles of polyolefins such as polyethylene and polypropylene are preferable as the polymer particle. The polymer particles can be used singly, or in combination of two or more kinds thereof. Note that the word "(meth) acrylate" means an acrylate or a methacrylate in the invention. Here, the softening point can be represented by the Vicat softening temperature or the like of the thermoplastic resin measured in accordance with JIS K7206. The average particle size of the polymer particle is not particularly limited, and is preferably from 0.1 to 5 μm, more preferably from 0.2 to 4.5 μm, and still more preferably from 0.5 to 4 μm from the viewpoint that the mixture layer can be uniformly applied to the current collector and the battery characteristic can be further improved. As for the softening point of the polymer particle, from the viewpoint of improving the handling property and the safety of the lithium ion secondary battery, the polymer particle more preferably has a softening point of from 90° C. to 140° C., and still more preferably from 110° C. to 135° C.

Specifically, CHEMIPEARL (registered trademark) series manufactured by Mitsui Chemicals, Inc. (aqueous dispersion of a polyolefin) are preferable, and low molecular weight polyethylene such as W400, W410, W700, W4005, W401, W500, WF640, W900, W950, or WH201 can be used in the form of finely divided aqueous dispersion.

The content of the polymer particle having a softening point of from 70° C. to 150° C. used in the negative electrode active material layer is preferably from 0.1 to 8% by mass, more preferably from 0.5 to 5% by mass, and still more preferably from 1 to 3% by mass with respect to the total amount of the negative electrode active material layer. As for the average particle size of the polymer particle, for example, in the negative electrode mixture layer formed so that the negative electrode active material layer containing the polymer particle having a softening point of from 70° C. to 150° C. has a thickness of about 70 μm, the average particle size can be determined by arithmetically averaging values of the long side lengths of all the polymer particles in an image of a transmission electron micrograph in the range of 10 μm in length×10 μm in width in the center portion of the negative electrode mixture layer.

As for the content of the polymer particle in the negative electrode mixture layer, the negative electrode mixture layer preferably contains the polymer particle at a content necessary to increase the resistance of the negative electrode continuously or stepwise until the temperature reaches the volume expansion start temperature of the thermally expandable microcapsule described below in a case in which the temperature of the negative electrode mixture layer rises above the softening point of the polymer particle owing to heat generation of the battery.

(Thermally Expandable Microcapsule)

The thermally expandable microcapsule (often referred to as "microsphere") is configured to enclose or encapsulate a volatile expanding agent in an outer shell which is composed of a thermoplastic resin. Such a thermally expandable microcapsule is manufactured by a method of suspending and polymerizing, in an aqueous dispersion medium, a polymerizable mixture containing at least a volatile expanding agent and a polymerizable monomer that provides a polymer which constitutes an outer shell. For example, Japanese Patent Publication (JP-B) No. S42-26524, Japanese Patent Application Laid-Open (JP-A) No. S62-286534, JP-A No. H4-292643, and JP-A No. H11-209504 disclose a method of manufacturing a thermally expandable thermoplastic microsphere, and the methods can be applied to the manufacturing of the thermally expandable microcapsule according to the invention.

The thermoplastic resin which constitutes the outer shell needs to have durability against the electrolytic solution described below. More specifically, it is desired that the outer shell structure is stably maintained in contact with the electrolytic solution until the temperature reaches the operating temperature of the battery (generally intended to be from room temperature to about 80° C.), and the thermoplastic resin rapidly softens and foams to cause large volume expansion at a predetermined temperature immediately before the thermal runaway starts owing to abnormal heat generation of the battery in a state that the volatile expanding agent described below is encapsulated, that is, at a temperature of from 70° C. to 180° C., preferably from 80° C. to 160° C., and more preferably from 100° C. to 140° C. In the present embodiment, the temperature at which the volatile expanding agent encapsulated in the microcapsule gasifies and starts volume expansion is referred to as the "volume expansion start temperature". Furthermore, the temperature at which the volatile expanding agent encapsulated in the microcapsule gasifies, expands in volume, and expands to the maximum is referred to as the "maximum volume expansion temperature". The maximum volume expansion temperature of the microcapsule in the present embodiment is preferably from 70° C. to 180° C., and the volume expansion start temperature is about from 20 to 30° C. lower than the maximum volume expansion temperature. Therefore, the thermoplastic resin itself preferably has a temperature at which the elastic modulus starts to decrease of from 40° C. to 160° C., and particularly preferably from 140° C. to 150° C. In the present embodiment, the boiling point of the volatile expanding agent is selected so that the maximum volume expansion temperature of the thermally expandable microcapsule is higher than the softening point of the polymer particle. Furthermore, the boiling point of the volatile expanding agent is preferably selected so that the volume expansion start temperature of the thermally expandable microcapsule is higher than the softening point of the polymer particle. By setting the maximum volume expansion temperature and the volume expansion start temperature of the thermally expandable microcapsules in such a manner, the resistance of the negative electrode can be efficiently increased in a case in which the temperature of the negative electrode mixture layer rises above the softening point of the polymer particle owing to heat generation of the battery.

That is, the thermoplastic resin which constitutes the outer shell of the microcapsule is preferably a polymer having excellent electrolytic solution resistance, thermoplasticity, and an excellent gas barrier property. From this viewpoint, the outer shell is preferably constituted with a (co)polymer containing vinylidene chloride and a (co)polymer containing (meth)acrylonitrile.

In consideration of the electrolytic solution resistance, the outer shell is preferably constituted with a (co)polymer containing (meth)acrylonitrile as a main component (51% by mass or more). Specific examples of the preferable polymer which constitutes the outer shell include copolymers obtained from a monomer mixture containing (a) 51% by mass or more of at least one monomer selected from the group consisting of acrylonitrile and methacrylonitrile and (b) 49% by mass or less of at least one monomer selected from the group consisting of vinylidene chloride, acrylates, methacrylates, styrene, and vinyl acetate. The monomer mixture more preferably contains (a) from 51 to 98% by mass of at least one monomer selected from the group consisting of acrylonitrile and methacrylonitrile, (b1) from 1 to 48% by mass of vinylidene chloride, and (b2) from 1 to 48% by mass of at least one monomer selected from the group consisting of acrylates and methacrylates. The (meth) acrylonitrile copolymerization ratio less than 51% by mass is not preferable because the solvent resistance and the heat resistance are reduced too much.

In order to improve the foaming characteristic and the heat resistance of the obtained microcapsule, a crosslinkable monomer can be used in combination with the polymerizable monomer. As the crosslinkable monomer, a compound having two or more carbon-carbon double bonds is usually used. More specific examples of the crosslinkable monomer include divinylbenzene, ethylene glycol di(meth)acrylate, diethylene glycol di(meth)acrylate, triethylene glycol di(meth)acrylate, allyl methacrylate, triallyl isocyanate, triacryl formal, trimethylolpropane tri(meth)acrylate, 1,3-butyl glycol dimethacrylate, and pentaerythritol tri(meth)acrylate. The crosslinkable monomer is usually used at a ratio of from 0.1 to 5% by mass with respect to the polymerizable monomer. For the purpose that the microcapsule has favorable durability against the electrolytic solution and reliably foams at a predetermined temperature in contact with the electrolytic solution, the crosslinkable monomer is preferably used at a ratio of 0.5% by mass, particularly from more than 1.0% by mass to 5% by mass, and particularly 4% by mass or less.

As the volatile expanding agent enclosed in the outer shell, a volatile organic compound is preferably used that gasifies at a predetermined temperature at which the microcapsule foams, more directly at a temperature equal to or lower than the softening point of the thermoplastic resin which constitutes the outer shell of the microcapsule. Examples of the volatile organic compound include low molecular weight hydrocarbons having a boiling point of 100° C. or less such as propane, propylene, n-butane, isobutane, butene, isobutene, isopentane, neopentane, n-pentane, n-hexane, isohexane, heptane, and petroleum ethers. Furthermore, in consideration of the safety inside the battery, examples of the volatile organic compound include non-flammable or flame-retardant compounds such as halogenated hydrocarbons and chlorofluorocarbons such as methyl chloride, methylene chloride, fluorotrichloromethane, difluorodichloromethane, and chlorotrifluoromethane. These compounds can be used singly, or in combination of two or more kinds thereof.

The average particle size (median size) of the thermally expandable microcapsule can be controlled by a method generally used in this field. For example, in the suspension polymerization, the average particle size can be controlled by selection of a dispersion stabilizer, that is, by the type (for example, an inorganic fine particle such as colloidal silica or magnesium hydroxide) or the amount of a dispersion stabilizer, by combination with an auxiliary stabilizer (such as a condensation product of diethanolamine and aliphatic dicarboxylic acid, polyvinylpyrrolidone, polyethylene oxide, an emulsifier, or salt), by selection of an emulsifying and dispersing means, or by an emulsifying condition (such as a stirring condition). The average particle size is usually from 1 to 40 μm, preferably from 3 to 30 μm, and particularly preferably from 5 to 25 μm. In particular, in a case in which the particle size distribution is sharp, the foaming start temperature is sharp and can be more suitably used in the invention. By selection of the volatile expanding agent and the polymerizable monomer and by control of the type and the amount of the crosslinkable monomer, the volatile expanding agent/polymerizable monomer weight ratio, and the like, a microcapsule can be obtained in which the expansion ratio is adjusted to a desired value in the range of from 2 to 100 times, preferably from 3 to 60 times.

At the above-described predetermined temperature, the thermally expandable microcapsule is desirably added in a minimum amount necessary for effectively separating the negative electrode active materials by the foaming of the thermally expandable microcapsule, for example, in an amount of from 0.1 to 4% by mass with respect to the negative electrode mixture layer. In a case in which the amount is less than 0.1% by mass, the effect of cutting the conductive path in the negative electrode mixture by the expansion of the microcapsule is small, and in a case in which the amount is 5% or more, the adhesive strength of the active material is reduced, and as a result, it is possible that the active material is detached during a charge and discharge process. In a case in which the amount is more than 4% by mass, the amount of the active material is reduced and undesirable in terms of the battery capacity.

Examples of the thermally expandable microcapsule usable in the invention include "MATSUMOTO MICROSPHERE (registered trademark)" series manufactured by Matsumoto Yushi-Seiyaku Co., Ltd., "EXPANCEL (registered trademark)" series manufactured by AKZO NOBEL CHEMICALS B. V., and "ADVANCELL (registered trademark)" series manufactured by SEKISUI CHEMICAL CO., LTD.

(Another Component)

The negative electrode mixture layer according to the present embodiment may contain another appropriate component in addition to each of the above-described components. For example, in a case in which the negative electrode mixture layer includes a mixture slurry, the negative electrode mixture layer sometimes contains a constituent component derived from the mixture slurry. Examples of the constituent component derived from the mixture slurry include thickeners and other additives such as surfactants, dispersants, wetting agents, and antifoaming agents.

(Method of Forming Negative Electrode Mixture Layer)

The negative electrode mixture layer included in the negative electrode for a lithium ion secondary battery according to the present embodiment can be manufactured by applying a negative electrode mixture slurry containing the negative electrode active material, the conductive auxiliary, the binder, the polymer particle, and the thermally expandable microcapsule to the surface of the current collector, and drying the negative electrode mixture slurry. The solvent contained in the mixture slurry may be an organic solvent or an aqueous dispersion, and water is preferably used in consideration of the stability of the polymer particle and the thermally expandable microcapsule. If necessary, for example, a liquid medium compatible with water may be used in order to improve the application property to the current collector. Examples of the liquid medium compatible with water include alcohols, glycols, cellosolves, amino alcohols, amines, ketones, carboxylic amides, phosphoric amides, sulfoxides, carboxylic acid esters, phosphoric esters, ethers, and nitriles, and the liquid mediums may be used as long as compatible with water.

In the applying and the drying of the mixture slurry on the current collector, the method of applying and the method of drying are not particularly limited. Examples of the method of applying include slot die coating, slide coating, curtain coating, and gravure coating. Examples of the method of drying include warm air drying, hot air drying, low-humidity air drying, vacuum drying, and drying by (far) infrared radiation. The drying time and the drying temperature are not particularly limited, and the drying time is usually from 1 minute to 30 minutes, and the drying temperature is usually from 40° C. to 80° C.

The method of manufacturing the negative electrode mixture layer preferably include a step of reducing the porosity of the active material layer by a pressure treatment using a mold press, a roll press, or the like after the applying and the drying of the mixture slurry on the current collector.

(Positive Electrode Active Material)

The positive electrode active material is not particularly limited as long as it is a material capable of absorbing and releasing lithium, and the positive electrode active material can be usually used in a lithium ion secondary battery. Specific examples of the positive electrode active material include oxides containing lithium (Li) and nickel (Ni) as constituent metal elements, and in addition, oxides containing at least one metal element other than lithium and nickel (that is, transition metal element other than Li and Ni and/or typical metal element) as a constituent metal element at a ratio that is the same extent as or less than that of nickel in terms of the atom number. The at least one metal element other than Li and Ni can be, for example, one metal element, or two or more metal elements selected from the group consisting of Co, Mn, Al, Cr, Fe, V, Mg, Ca, Na, Ti, Zr, Nb, Mo, W, Cu, Zn, Ga, In, Sn, La, and Ce. The positive electrode active materials may be used singly, or in mixture of two or more kinds thereof.

In a preferred embodiment, examples of the positive electrode active material include lithium nickel cobalt aluminum-based oxides (NCA) represented by Formula (1): $Li_tNi_{1-x-y}Co_xAl_yO_2$ (wherein $0.95 \leq t \leq 1.15$, $0 \leq x \leq 0.3$, $0.1 \leq y \leq 0.2$, and $x+y<0.5$). Specific examples of the NCA include $LiNi_{0.8}Co_{0.15}Al_{0.05}O_2$.

In another preferred embodiment, examples of the positive electrode active material include lithium nickel cobalt manganese-based oxides (NCM) represented by Formula (2): $LiNi_aCo_bMn_cO_2$ (wherein $0<a<1$, $0<b<1$, $0<c<1$, and $a+b+c=1$). The NCM has a high energy density per volume and excellent thermal stability.

The electrode mixture layer usually contains the positive electrode active material at a content of 10% by mass or more, preferably 30% by mass or more, more preferably 50% by mass or more, and particularly preferably 70% by mass or more. Furthermore, the content is usually 99.9% by mass or less, and preferably 99% by mass or less.

Examples of a binder that may be used in the positive electrode active material layer include polyvinyl acetate, polymethyl methacrylate, nitrocellulose, fluorine resins, and rubber particles. Examples of the fluorine resin include polytetrafluoroethylene (PTFE), polyvinylidene fluoride (PVDF), tetrafluoroethylene-hexafluoropropylene copolymers (FEP), and vinylidene fluoride-hexafluoropropylene copolymers. Examples of the rubber particle include styrene-butadiene rubber particles and acrylonitrile rubber particles. Among the binders, a binder containing fluorine is preferable in consideration of, for example, improving the oxidation resistance of the positive electrode active material layer. The binders can be used singly, or if necessary, in combination of two or more kinds thereof.

[Electrolytic Solution]

The electrolytic solution is preferably, for example, one usually used in a lithium ion secondary battery, and is specifically one having a form in which a supporting salt (lithium salt) is dissolved in an organic solvent. Examples of the lithium salt include at least one selected from an inorganic acid anion salt such as lithium hexafluorophosphate ($LiPF_6$), lithium tetrafluoroborate ($LiBF_4$), lithium perchlorate ($LiClO_4$), lithium hexafluoroarsenate ($LiAsF_6$), lithium hexafluorotantalate ($LiTaF_6$), lithium tetrachloroaluminate ($LiAlCl_4$), or lithium decachlorodecaborate ($Li_2B_{10}Cl_{10}$), or an organic acid anion salt such as lithium trifluoromethanesulfonate ($LiCF_3SO_3$), lithium bis(trifluoromethanesulfonyl)imide ($Li(CF_3SO_2)_2N$), or lithium bis(pentafluoroethanesulfonyl)imide ($Li(C_2F_5SO_2)_2N$). Among the lithium salts, lithium hexafluorophosphate ($LiPF_6$) is preferable.

As the organic solvent, for example, at least one can be used selected from the group consisting of cyclic carbonates, fluorine-containing cyclic carbonates, chain carbonates, fluorine-containing chain carbonates, aliphatic carboxylic acid esters, fluorine-containing aliphatic carboxylic acid esters, γ-lactones, fluorine-containing γ-lactones, cyclic ethers, fluorine-containing cyclic ethers, chain ethers, and fluorine-containing chain ethers.

Examples of the cyclic carbonate include propylene carbonate (PC), ethylene carbonate (EC), and butylene carbonate (BC). Examples of the fluorine-containing cyclic carbonate include fluoroethylene carbonate (FEC). Examples of the chain carbonate include dimethyl carbonate (DMC), diethyl carbonate (DEC), ethyl methyl carbonate (EMC), methyl propyl carbonate (MPC), ethyl propyl carbonate (EPC), and dipropyl carbonate (DPC). Examples of the aliphatic carboxylic acid ester include methyl formate, methyl acetate, and ethyl propionate. Examples of the γ-lactone include γ-butyrolactone. Examples of the cyclic ether include tetrahydrofuran, 2-methyltetrahydrofuran, and 1,4-dioxane. Examples of the chain ether include 1,2-ethoxyethane (DEE), ethoxymethoxyethane (EME), diethyl ether, 1,2-dimethoxyethane, and 1,2-dibutoxyethane. Other examples include nitriles such as acetonitrile and amides such as dimethylformamide. These can be used singly, or in combination of two or more kinds thereof.

[Separator]

Examples of the separator include microporous films including a resin such as polyethylene (PE), polypropylene (PP), a polyester, cellulose, or a polyamide; porous flat plates; and nonwoven fabrics. Preferable examples include porous resin sheets having a single-layer or multi-layer structure that mainly include one, or two or more polyolefin resins. The separator can have a thickness of, for example, from 15 µm to 30 µm. In a preferred aspect, the separator includes a porous resin layer including a thermoplastic resin such as polyethylene, and has a shutdown function. According to the aspect, in a case in which the temperature of the separator reaches the softening point of the thermoplastic resin, the resin is melted and the pores are clogged, so that the current can be cut off.

(Effects)

In the negative electrode mixture layer 12B in the present embodiment, it is considered that in a case in which the battery temperature rapidly rises owing to crushing, overcharge, or the like, the internal resistance of the battery (the resistance of the negative electrode mixture layer) is increased by the binder, the polymer particle having a softening point of from 70° C. to 150° C., and the thermally expandable microcapsule having a maximum volume expansion temperature that is higher than the softening point of the polymer particle, so that the short-circuit current is significantly reduced and the heat generation of the battery is suppressed. The detailed mechanism is not necessarily clear, and is presumed as follows. An explanation with reference to FIG. 2 is that first, the negative electrode mixture layer during usual operation contains the conductive auxiliary 32 among the negative electrode active materials 31 so that the interface resistance (contact resistance) is reduced. The binder 33 and the polymer particle (for example, CHEMIPEARL) are preferentially adsorbed to the conductive auxiliary and bind the negative electrode active materials to form a conductive path. In a case in which the temperature of the negative electrode mixture layer 12B reaches to from 90 to 120° C., the polymer particle 33 is melted first to partially cut the conductive path. Subsequently, in a case in which the temperature of the battery reaches to from 120 to 135° C., the separator (PE) is melted to cut off the passage of a lithium ion. Furthermore, in a case in which the temperature of the negative electrode mixture layer rises to from 130 to 150° C., it is considered that the microcapsule thermally expands (the particle size increases by about from 3 to 5 times by the thermal expansion), and expands a gap among the negative electrode active materials (a gap expands in the negative electrode mixture layer). These actions are continuously caused, so that the internal resistance of the battery (electrode resistance) is increased, the short-circuit current is significantly reduced, and the effect of suppressing the heat generation of the entire battery is exhibited.

Figure 4:
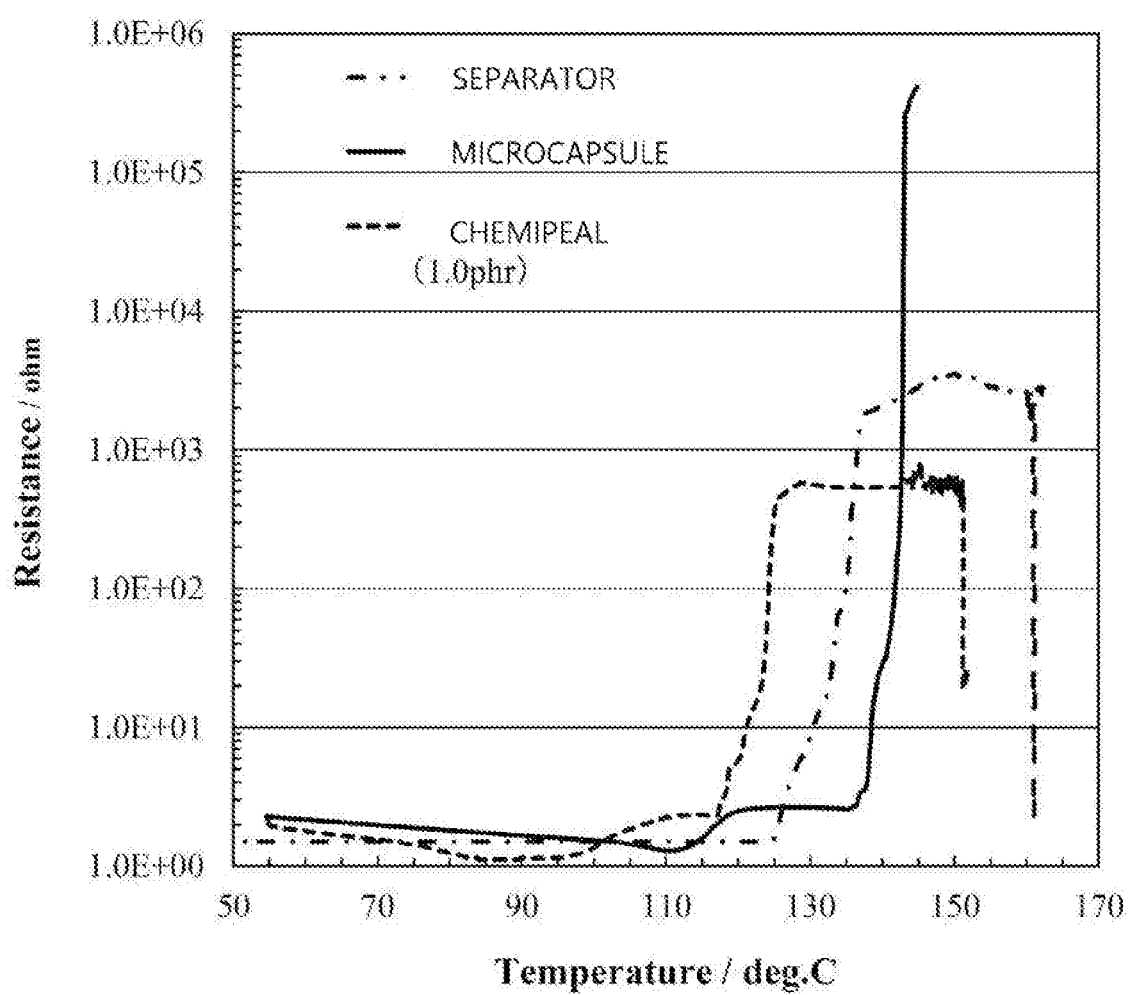
FIG. 4 shows results of heating resistance tests performed using another sample cell prepared in Example.

FIG. 4 shows a graph in which results of heating resistance tests are plotted in the case of a lithium ion secondary battery according to a preferred embodiment of the invention, in which the polymer particle (CHEMIPEARL) or the microcapsule is singly added to the negative electrode mixture layer, or the separator having the shutdown function is singly used. From about 115° C., the resistance of the negative electrode mixture layer increases owing to the melting of the polymer particle, from around 125° C., the resistance due to the melting of the separator increases, and from around 140° C., the resistance increase due to the expansion of the microcapsule can be seen. Under the experimental conditions in FIG. 4, it is understood that the resistance increase due to the various materials can be caused continuously or stepwise by setting the addition amount of CHEMIPEARL to the negative electrode mixture layer to 1% by mass. Therefore, it is considered that in the lithium ion secondary battery according to the present embodiment, the resistance of the negative electrode effectively increases owing to heat generation due to an internal short-circuit or the like, so that the heat generation of the battery can be suppressed and the thermal runaway can be prevented.

EXAMPLE

Example 1

—Preparation of Negative Electrode—

1. Preparation of Slurry

A slurry was prepared using a 5 L planetary disperser.

For 5 minutes, 960 g of natural graphite, 10 g of SUPER P (conductive carbon, BET specific surface area: 62 m$^2$/g), and 5 g of a microcapsule (FS-100SD manufactured by Matsumoto Yushi-Seiyaku Co., Ltd., expansion start temperature: 125-135° C., maximum expansion temperature: 150-160° C.) were mixed, then 450 g of 1% CMC (CMC dissolved in pure water) was added, and the mixture was further mixed for 30 minutes. Next, 300 g of a 1%-CMC aqueous solution was added, the mixture was kneaded for 30 minutes, then 250 g of 1%-CMC was further added, and the mixture was kneaded for 30 minutes. Then, 25 g of SBR (40% emulsion) serving as a binder and 12.5 g of a polymer particle (manufactured by Mitsui Chemicals, Inc., CHEMIPEARL (registered trademark) W4005, softening point: 110° C., 40% emulsion) were added, and the mixture was mixed for 30 minutes and then vacuum-degassed for 30 minutes. Thus, a slurry having a solid content concentration of 45% was prepared. The negative electrode prepared in this manner has a composition having a mass ratio of natural graphite:SUPER P:SBR:CMC:CHEMIPEARL:microcapsule=960:10:10:10:5:5.

2. Application and Drying

The slurry was applied using a die coater. The slurry was applied to one surface of a copper foil (thickness: 10 µm) and dried so that the applied slurry has a weight of 11.0 mg/cm$^2$ after the drying. Next, the slurry was applied to the other surface (surface without application) of the copper foil and dried so that the applied slurry has a weight of 11.0 mg/cm$^2$ in the same manner. The obtained negative electrode roll having both the surfaces under the application (22.0 mg/cm$^2$) was dried in a vacuum drying oven at 120° C. for 12 hours to obtain an electrode.

3. Press

A small press was used. The gap (interval) between the upper and the lower rolls was adjusted, and the negative electrode was pressed so that the press density was 1.45±0.05 g/cm$^3$.

4. Slitting

The electrode was slit so that the application area of the electrode (front surface: 58 mm×372 mm, back surface: 58 mm×431 mm) and a margin for welding a tab were obtained to obtain a negative electrode A-1.

—Preparation of Positive Electrode—

1. Preparation of Slurry

A slurry was prepared using a 5 L planetary disperser. For 10 minutes, 920 g of NCM523 (manufactured by Umicore, composition formula: LiNi$_{0.5}$Co$_{0.2}$Mn$_{0.3}$O$_2$), 20 g of SUPER P (conductive carbon manufactured by TIMCAL Ltd.), and 20 g of KS-6 (flaky graphite manufactured by TIMREX) were mixed, then 100 g of N-methylpyrrolidone (NMP) was added, and the mixture was further mixed for 20 minutes.

Next, 150 g of an 8%-binder solution was added, the mixture was kneaded for 30 minutes, then 150 g of an 8%-binder solution was further added, and the mixture was kneaded for 30 minutes. Then, 200 g of an 8%-binder solution was added, and the mixture was kneaded for 30 minutes. Next, 80 g of a solution dissolved in NMP was added, and the mixture was kneaded for 30 minutes. Then, 27 g of NMP was added, and the mixture was mixed for 30 minutes for viscosity adjustment and then vacuum-degassed for 30 minutes. Thus, a slurry having a solid content concentration of 60% was prepared.

2. Application and Drying

The slurry was applied using a die coater. The slurry was applied to one surface of an aluminum foil (thickness: 20 µm, width: 200 mm) and dried so that the applied slurry has a weight of 19.0 mg/cm$^2$ after the drying. Next, the slurry was applied to the other surface (surface without application) of the aluminum foil and dried so that the applied slurry has a weight of 19.0 mg/cm$^2$ in the same manner.

The obtained positive electrode roll having both the surfaces under the application (38.0 mg/cm$^2$) was dried in a vacuum drying oven at 130° C. for 12 hours.

3. Press

A 35 ton press was used. The gap (interval) between the upper and the lower rolls was adjusted, and the positive electrode was pressed so that the press density was 2.9±0.05 g/cm$^3$.

4. Slitting

The electrode was slit so that the application area of the electrode (front surface: 56 mm×334 mm, back surface: 56 mm×408 mm) and a margin for welding a tab were obtained to obtain a positive electrode C-1.

—Preparation of Battery—

Stacked Battery (Design Capacity: 5 Ah)

An aluminum tab was joined to the margin portion of the positive electrode C-1 using an ultrasonic joining machine. A nickel tab was joined to the margin portion of the negative electrode A-1 using an ultrasonic joining machine.

1. Stacking Layers

As a separator, a polyethylene porous film (183 mm×100 mm) having a porosity of 45% and a thickness of 25 µm was used (S-2).

The negative electrode A-1, the separator (S-1), the positive electrode C-1, the separator (S-1), and the negative electrode A-1 were stacked in this order to form a laminate alternately having the positive electrode and the negative electrode, and the laminates were stacked to form a laminate having five positive electrodes and six negative electrodes. Next, the laminate was sandwiched between laminate sheets, and the resulting product was heat-sealed on the three sides.

2. Putting Electrolytic Solution

The resulting product was dried under reduced pressure at 70° C.×12 h using a vacuum dryer before putting an electrolytic solution. Into the resulting product, 19.6±0.3 g of an electrolytic solution (1 mol-LiPF$_6$, EC/DEC=3/7 (vol. ratio), additive: VC 1.0% by mass) was put, and then the resulting product was heat-sealed under vacuum.

3. Activation Processing

A battery after putting the electrolytic solution was held for 24 hours. Next, the battery was charged at a constant current of 0.05 C for 4 hours (0.05 C-CC), and then the charging was paused for 12 hours. Then, the battery was charged at a constant current of 0.1 C and a constant voltage up to 4.2 V (0.1 C-CCCV), the charging was paused for 30 minutes, and then the battery was discharged at a constant current of 0.1 C up to 2.8 V (0.1 C-CC). Furthermore, a charge and discharge cycle (charging at 0.1 C-CCCV to 4.2 V and discharging at 0.1 C-CC to 2.8 V) were repeated five times, and then the battery was stored in a full charge state at 4.2 V (SOC 100%) at 25° C. for 5 days. Thus, a battery D-1 was obtained.

[Method of Measuring Heating Resistance]

A test negative electrode was prepared in accordance with Example 1 by way of trial and subjected to a heating resistance test by the following method.

[Preparation of Sample]

A nickel tab was joined using an ultrasonic joining machine to the margin portion of the test negative electrode A-1 prepared in Example 1 (single-side application, electrode surface: 30 mm×30 mm) (AK2). An aluminum tab was joined using an ultrasonic joining machine to the margin portion of the test positive electrode C-1 prepared in Example 1 (single-side application, electrode surface: 28 mm×28 mm) (CK2).

A PP separator (30 mm×30 mm) was interposed between the application surface of AK2 and the application surface of CK2. The resulting laminate was sandwiched between laminate sheets having a size of 5 cm×5 cm, and the resulting product was heat-sealed on the three sides. The resulting product was dried under reduced pressure at 70° C.×12 h using a vacuum dryer before putting an electrolytic solution. Into the resulting product, 300 µL of an electrolytic solution (1 mol-LiPF$_6$, EC/DEC=3/7 (vol. ratio)) was put, and then the resulting product was heat-sealed under vacuum (K2).

[Heating Resistance Measurement]

The prepared sample cell (K2) was sandwiched between heat blocks at a restraining surface pressure of from 0.2 kgf/cm$^2$ to 3.0 kgf/cm$^2$ under a measurement condition in which, for example, the temperature was raised from room temperature to about 200° C. at a rate of 5° C./min. At this time, an AC resistance value ($\Omega$) at each frequency (for example, 1 kHz, 10 kHz, or 100 kHz) was obtained. Examples of the results are shown in FIGS. 3 to 5.

Figure 3:
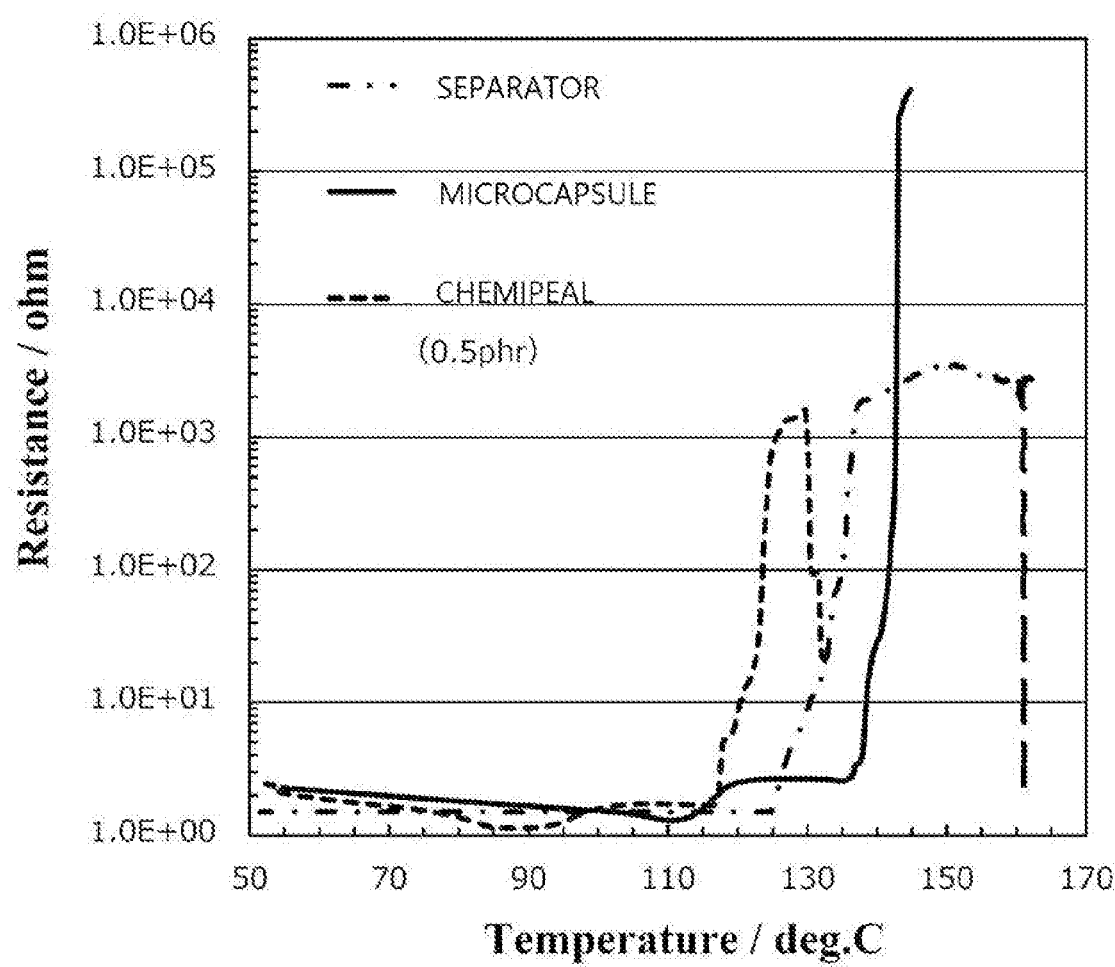
FIG. 3 shows results of heating resistance tests performed using a sample cell prepared in Example.

FIG. 3 shows a comparison of results of heating resistance measurement of sample cells each singly including a negative electrode mixture layer containing CHEMIPEARL (registered trademark) at a content of 0.5% by mass, a negative electrode mixture layer containing a microcapsule FS-100SD at a content of 0.5% by mass in the same manner, or a PE separator in accordance with Example 1. In the same manner, FIG. 4 shows a comparison of results of heating resistance measurement of sample cells each singly including a negative electrode mixture layer containing CHEMIPEARL (registered trademark) at a content of 1.0% by mass, a negative electrode mixture layer containing a microcapsule FS-100SD at a content of 0.5% by mass in the same manner, or a PE separator in accordance with Example 1.

Figure 5:
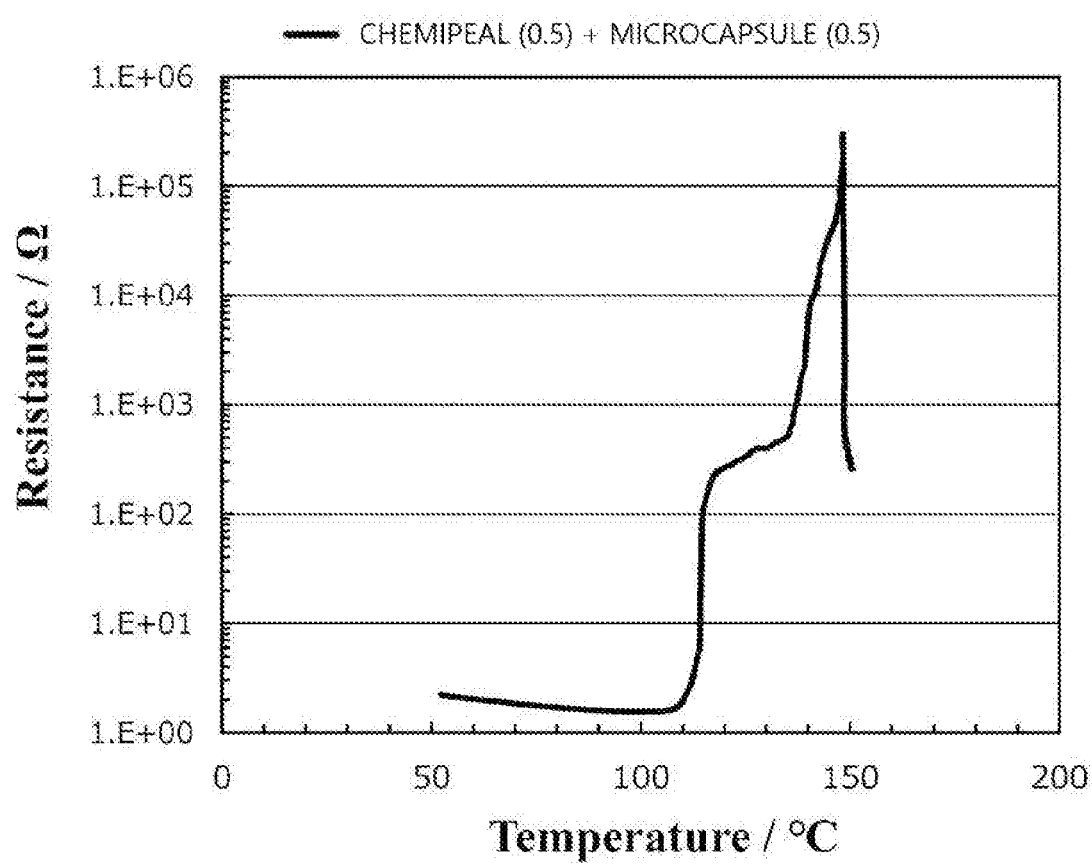
FIG. 5 shows a result of heating resistance measurement of a sample cell including a negative electrode mixture layer prepared in Example 1 that contains CHEMIPEARL (registered trademark) at a content of 0.5% by mass and a microcapsule at a content of 0.5% by mass.

FIG. 5 shows a result of heating resistance measurement of a sample cell including a negative electrode mixture layer in Example 1 that contains both CHEMIPEARL (registered trademark) at a content of 0.5% by mass and a microcapsule FS-100SD at a content of 0.5% by mass. From the results shown in FIGS. 3 to 5, it has been found that the resistance of the sample cell increases in response to the softening temperature of the PE used as a material of the separator, the softening point of CHEMIPEARL (registered trademark), and the expansion start temperature or the maximum expansion temperature of the microcapsule.

The disclosure of Japanese Patent Application No. 2018-068815 filed on Mar. 30, 2018 is incorporated herein by reference in its entirety.

All documents, patent applications, and technical standards described herein are incorporated herein by reference to the same extent as in a case in which each document, patent application, and technical standard are specifically and individually stated to be incorporated herein by reference.

The invention claimed is:

1. A negative electrode for a lithium ion secondary battery, the negative electrode comprising:
   a negative electrode current collector; and
   a negative electrode mixture layer that is applied to at least one side of the negative electrode current collector, the negative electrode mixture layer comprising:
   a negative electrode active material,
   a conductive auxiliary,
   a binder,
   a polymer particle having a softening point of from 70° C. to 150° C., and
   a thermally expandable microcapsule having a maximum volume expansion temperature that is higher than the softening point of the polymer particle; and wherein the conductive auxiliary comprises a carbon particle having an average particle size of 5 um or less and a primary particle size of 0.5 um or less, the binder has an average particle size of from 0.1 to 0.3 um, and the polymer particle has an average particle size of from 0.1 to 5 um.

2. The negative electrode according to claim 1, wherein the softening point of the polymer particle is lower than a volume expansion start temperature of the thermally expandable microcapsule.

3. The negative electrode according to claim 1, wherein the negative electrode mixture layer contains the conductive auxiliary at a content of from 0.1 to 3% by mass, and contains the binder and the polymer particle at a total combined content of from 0.5 to 4% by mass.

4. The negative electrode according to claim 1, wherein the thermally expandable microcapsule has an average particle size of 50 μm or less.

5. The negative electrode according to claim 1, wherein the negative electrode mixture layer contains the thermally expandable microcapsule at a content of from 0.1 to 4% by mass.

6. The negative electrode according to claim 1, wherein the thermally expandable microcapsule includes:
   an outer shell including a thermoplastic resin; and
   a volatile expanding agent that includes a hydrocarbon having a boiling point of 100° C. or less and is enclosed in the outer shell.

7. The negative electrode according to claim 1, wherein the binder is polyacrylic acid, styrene-butadiene rubber, polyvinyl alcohol, polyvinyl acetate, polyethylene oxide, polyvinyl pyrrolidone, or polyacrylamide.

8. A lithium ion secondary battery, comprising:
   the negative electrode according to claim 1;
   a positive electrode;
   a separator; and
   a lithium ion.

9. The lithium ion secondary battery according to claim 8, wherein the separator includes a thermoplastic resin, and the thermoplastic resin has a softening point that is higher than the softening point of the polymer particle and lower than the volume expansion start temperature of the thermally expandable microcapsule.

10. A lithium ion secondary battery comprising a negative electrode having a resistance that increases as a result of heat generation due to an internal short-circuit, the negative electrode including a negative electrode mixture layer that comprises:
    a negative electrode active material;
    a conductive auxiliary;
    a binder;
    a polymer particle having a softening point of from 70° C. to 150° C.; and
    a thermally expandable microcapsule having a volume expansion start temperature that is higher than the softening point of the polymer particle, wherein the conductive auxiliary comprises a carbon particle having an average particle size of 5 um or less and a primary particle size of 0.5 um or less, the binder has an average particle size of from 0.1 to 0.3 um, and the polymer particle has an average particle size of from 0.1 to 5 um,
    wherein the negative electrode mixture layer contains each of the polymer particle and the thermally expandable microcapsule at a content necessary for increasing the resistance of the negative electrode continuously or stepwise in a case in which a temperature of the negative electrode mixture layer rises above the softening point of the polymer particle as a result of the heat generation.

* * * * *